April 19, 1938.  W. J. PHANEUF  2,114,607
BROACH
Filed Aug. 19, 1936
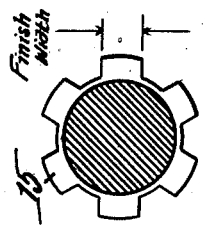
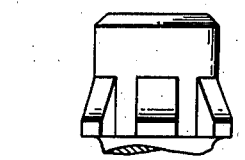
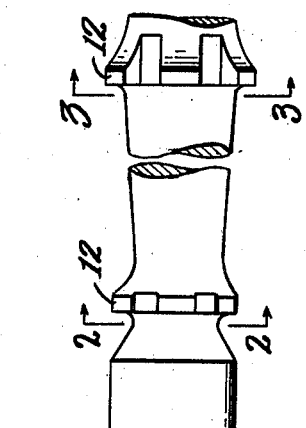
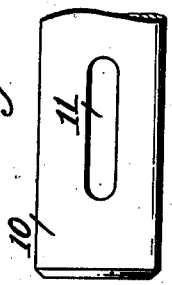
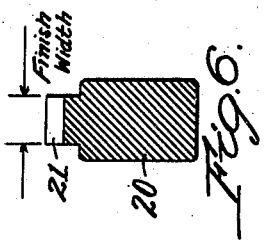
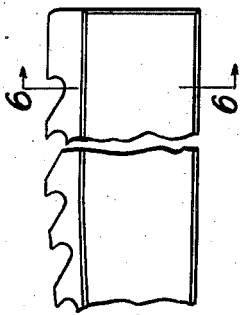
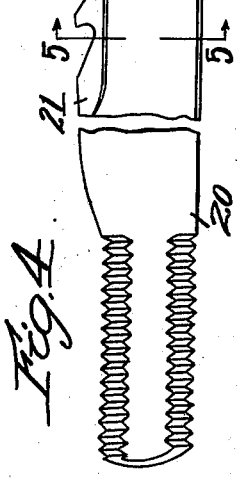
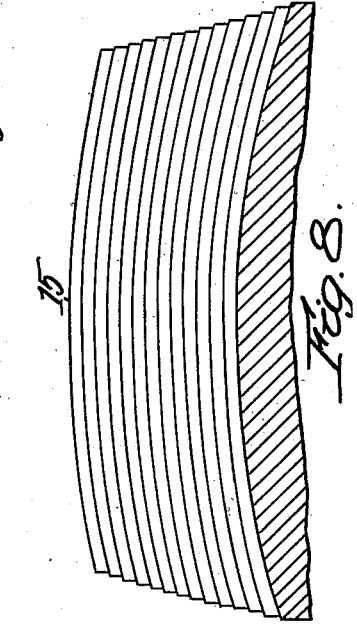
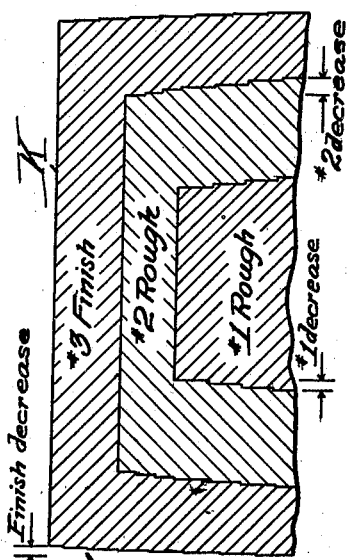
Inventor
Wilrose J. Phaneuf
by attorney
Chas. T. Hawley Patented Apr. 19, 1938

2,114,607

UNITED STATES PATENT OFFICE 2,114,607

BROACH

Wilrose J. Phaneuf, Hudson, Mass., assignor to The Lapointe Machine Tool Company, Hudson, Mass., a corporation of Maine Application August 19, 1936, Serial No. 96,827

2 Claims. (Cl. 29—95.1)

This invention relates to broaches for producing multiple splined holes and to cutter bars for cutting internal keyway slots, and relates also to a novel method of removing stock in a broaching operation. Throughout this specification the term "broach" is to be understood as including also bars for cutting internal keyway slots or for performing other similar operations.

When using multiple spline broaches or keyway cutters in certain kinds of material, the teeth of the tool have a tendency to "load" with particles of the metal being cut, which metal particles adhere or "freeze" firmly to the teeth of the tool. When these teeth are thus loaded, excessive friction is developed in the use of the tool and the teeth wear rapidly and are frequently broken. The quality of the finish produced by the tool is also injuriously affected.

It is the general object of my invention to provide an improved multiple spline broach or keyway cutter bar so constructed that loading of the teeth will be overcome, that the life of the tool will be much prolonged, and that a superior surface finish on the work will be attained.

To the accomplishment of this object, I provide clearance for successive cutting teeth in a manner not previously practiced.

A further feature of my invention relates to the removal of metal by a novel ordered procedure which reduces friction and which effects improved and very accurate results.

My invention further relates to arrangements and combinations of parts which will be hereinafter described and more particularly pointed out in the appended claims.

Preferred forms of the invention are shown in the drawing, in which—

Fig. 1 is a side elevation, partially broken away, of a multiple spline broach embodying my improvement;

Figs. 2 and 3 are sectional end elevations of the broach, taken along the lines 2—2 and 3—3 in Fig. 1;

Fig. 4 is a side elevation, partially broken away, of a keyway cutter bar embodying my improvement;

Figs. 5 and 6 are sectional end elevations, taken along the lines 5—5 and 6—6 in Fig. 4;

Fig. 7 is a highly magnified diagrammatic view illustrating the removal of metal by the use of my improved broaches but showing exaggerated clearance; and Fig. 8 is a highly magnified diagrammatic view illustrating the relation of successive teeth in a tool embodying my improvements, also with exaggerated clearance.

Referring to Figs. 1 to 3, I have shown a multiple spline broach so constructed as to embody my improvements and comprising the usual pull end 10 having a slot 11 through which a key may be inserted to attach the broach to the draw head of a broaching machine. The broach shown in Figs. 1 to 3 is provided with a plurality of cutting elements 12 having teeth 15 by which keyways for multiple splines are progressively cut as the broach is drawn through the work. This broach may be of any desired length, up to several feet, and may have any desired number of axial rows of teeth, which teeth may also be of any form and may be serration, gear form, dovetail, radial or flat top shape.

My invention is directed particularly to the relations of the teeth 15 in each axial row of teeth by which the stock is removed in forming a keyway.

The teeth 15 of the cutting elements 12 may be of the general appearance indicated in Figs. 2 and 3 and increase gradually in height towards the finish end of the broach in the usual way, so that as the broach is drawn through the work, the keyways are gradually deepened, all as is customary in broaching operations.

The novel feature of my invention by which greatly improved results are attained resides in slightly reducing the width of the teeth 15 progressively toward the finish end of the broach, so that the teeth 15 of each cutting element 12 are progressively higher and very slightly narrower than the teeth of the next preceding cutting element, taken in the order of broaching.

The operative result of this progressive decrease in width with increase in height is indicated diagrammatically and on a highly magnified scale in Fig. 7, which shows a keyway K cut in a piece of work by the successive operation of three broaches each embodying my improvements.

It will be noted that the first cut for each broach at the bottom of the keyway is of relatively slight thickness but of extreme width for that particular broach, and that each successive cut is of slightly greater thickness or depth but also of slightly reduced width, so that each successive cutting tooth has a slight side clearance in the portion of the keyway or slot cut by the preceding teeth.

In Fig. 7 the keyway K is indicated as being produced by the operation of a No. 1 roughing broach, a No. 2 roughing broach and a No. 3 finish broach. The number of broaches may be varied as desired.

The relative proportions of successive cuts and particularly the side clearance is greatly exaggerated in Fig. 7, as the actual decrease in width of successive teeth is much too small to be visible or to be detected except by micrometer measurements.

Fig. 7 does indicate, however, that the clearance in the No. 3 or finish broach is to be substantially less than the clearance in the No. 1 or No. 2 roughing broaches.

In Fig. 8 the appearance of the successive teeth in one of the axial rows of teeth in a multiple spline broach is indicated, looking from the head end or from the left in Fig. 1. Fig. 8 indicates clearly that each successive tooth is progressively higher and also slightly narrower than the preceding tooth in the order of cutting.

While the decrease in width between the first and last cutting teeth is commonly only a few thousandths or less, the improvement in operation is quite surprising, as the tendency of the teeth to load is almost entirely eliminated.

The clearance in the roughing broaches may be greater or less as proves desirable for a particular piece of work, but the amount of clearance in the finish broach should never be greater than the allowable tolerance, so that the first tooth will not be wider than the maximum allowed width of the keyway and the final tooth will not be less than the minimum allowed width of the keyway.

In Figs. 4, 5 and 6 I have shown a broach in the form of a keyway cutter bar 20 adapted to cut a single slot or keyway. In this cutter bar the cutting teeth 21 are progressively higher and also progressively narrower from the first to the last tooth in the order of cutting, and the broaching or cutting operation performed thereby is in all respects similar to the operation of the broach shown in Figs. 1 to 3 and previously described.

It will be understood that the cutter bar may be of any desired length up to several feet and also of any desired width, and that the teeth may be of any desired cross section.

Certain features of the invention may also be used to advantage in broaches of other cross sections, such as square, hexagonal and octagonal broaches.

Having thus described my invention and the advantages thereof, I do not wish to be limited to the details herein disclosed, otherwise than as set forth in the claims, but what I claim is:—

1. A broach or cutter bar comprising a series of cutting teeth, each successive tooth in the order of cutting being slightly higher and slightly narrower throughout its full height than its preceding tooth and thereby having slight side clearance with respect to the sides of a slot cut by the preceding teeth.

2. A multiple splined broach comprising a plurality of axially disposed series of cutting teeth, the teeth in each axial series being progressively higher and successively narrower throughout their full height in the order of cutting, whereby each tooth has a slight side clearance for the full depth of the cut with respect to the sides of the cut made by the next preceding tooth.

WILROSE J. PHANEUF.